UNITED STATES PATENT OFFICE.

EDWARD J. DE SMEDT, OF WASHINGTON, DISTRICT OF COLUMBIA, ASSIGNOR TO THE CUMBERLAND HYDRAULIC CEMENT AND MANUFACTURING COMPANY, OF CUMBERLAND, MARYLAND.

HYDRAULIC-CEMENT COMPOUND.

SPECIFICATION forming part of Letters Patent No. 275,369, dated April 10, 1883.

Application filed July 1, 1882. (No specimens.)

*To all whom it may concern:*

Be it known that I, EDWARD JOSEPH DE SMEDT, of the city of Washington, in the District of Columbia, have invented a new and useful composition of matter consisting of a hydraulic cement formed by the combination, compounding, and treatment of certain natural rocks found in the Potomac cement formations, as shown by the outcroppings near Cumberland, Maryland, as hereinafter fully described in the following, which is a specification.

In order to more fully explain my invention, it is necessary to set out at some length the various setting qualities of American hydraulic cements, and the difficulties attending the practical use of many of them, which my invention serves to overcome. It has been found from long experience that the hydraulic cements made from the cement-rocks in ordinary use, taken from the Potomac formations, as manufactured at or near Cumberland, Maryland, are what are known as "hot quick-setting" cements, which set in from three to five minutes, and are therefore not adapted to use in large quantities, whereas the cements manufactured from the rocks of what is known as the "Rosendale" formation, in common use, are cold slow-setting cements, which set in from fifteen to thirty minutes, and can therefore be worked in large quantities without destroying their first bond, as happens in large work where the hot quick-setting cements are used.

By experiment I have found that the quick-setting qualities of the first-mentioned class of cements was accompanied by a disproportionate amount of carbonate of lime to the amount of silica and silicate-of-alumina compounds in the rocks ordinarily used in the manufacturing of this class of cements.

My invention therefore consists of a new article of manufacture—a hydraulic cement—made from one or more of the strata of cement-rocks found in the Potomac cement formations at or near Cumberland, Maryland, or their equivalents, in which the quick-setting quality is corrected and cold slow-setting qualities in a greater or lesser degree substituted therefor by combination with not more than fifty per cent. of the silicious or slaty rock known as the "L" rock of said formation, or its equivalent.

In making my cold slow-setting cement I add to the cement-rocks which in various combinations are commonly used in the manufacture of cement from the cement-rocks of the Potomac cement formation, or their equivalents, already stated, where quick-setting cements are made, another natural rock or rocks of a silicious or slaty character, known as the "L" rock of the Potomac cement formation, or its equivalent, outcropping at or near Cumberland, Maryland, and elsewhere, and which has not heretofore been used in making cement, and of itself not classed among the cement-producing rocks.

In the process of manufacture the L rock may be placed in the kiln, together with the other rocks in common use, as aforesaid, and the whole mass calcined together; or the L rock may be calcined separately and mixed in the crackers or elsewhere in the mill with the calcined product of the cement-rocks in common use, as aforesaid; or the L rock may be added in the proper proportions to the calcined rocks or product while the said L rock is in a dry and natural state, and the mass reduced to a cement-powder.

The proportionate amount of the L rock described in the manufacture of my improved cement never exceeds one-half in bulk of the total amount of rocks used in the manufacture of the finished product, and may vary in lesser amounts in proportion to the slow-setting qualities desired in the manufactured product, the larger amount producing the slowest-setting cement.

Having fully described my invention, I claim—

1. A new article of manufacture—a cold slow-setting hydraulic cement—composed of not more than fifty per cent. in bulk of a slaty or silicious non-cement-producing rock—such as the L rock of the Potomac strata—in combination with not less than fifty per cent. in bulk of one or more of the hot quick-setting cement-producing rocks in common use in the manufacture of cements, whether the said combination of raw materials be calcined together in mass or mixed after separate calcination, or the slaty or silicious non-cement-producing rock be added in a raw state after the other rock or rocks have been separately treated to calcination, the relative proportions within the limit specified varying in proportion to the degree of cold or slow-setting quality desired, all substantially as described, and for the purpose specified.

2. As a new process in the manufacture of cold slow-setting hydraulic cements, the addition or admixture with the cement-producing rocks before calcination or after separate calcination of not more than fifty per cent. in bulk of a slaty or silicious non-cement-producing rock, as a calcined corrective of quick-setting qualities due to an excess of carbonate of lime in varying proportions, substantially as described, and for the purpose specified.

3. As a new process in the manufacture of cold slow-setting hydraulic cements, the addition or admixture, with quick-setting calcined cement-rocks of not more than fifty per cent., in bulk, of raw, slaty, or silicious non-cement-producing rock, as an uncalcined corrective of quick-setting qualities due to an excess of carbonate of lime in varying proportions, substantially as described, and for the purpose specified.

In witness whereof I have hereunto set my hand this 1st day of July, 1882, in the presence of witnesses.

E. J. DE SMEDT.

Witnesses:
R. W. LESLEY,
L. I. O'NEAL.